United States Patent Office 3,454,359
Patented July 8, 1969

3,454,359
PROCESS FOR PRODUCING BORIC ACID FROM ALKALI METAL BORATES
Henry Barclay Morley, Stamford, Conn., and Adam E. Skrzec, West Nyack, and Jerome C. Shiloff, Pleasantville, N.Y., assignors to Stauffer Chemical Company, New York, N.Y., a corporation of Delaware
Filed Apr. 29, 1966, Ser. No. 546,388
Int. Cl. C01b 35/00
U.S. Cl. 23—149          16 Claims

ABSTRACT OF THE DISCLOSURE

Boric acid from alkali metal borates is produced by contacting a particulate alkali metal borate with a gaseous reaction mixture comprising a major proportion of superheated steam and a minor reactive proportion of sulfur trioxide-containing materials at a reaction temperature of above about 185° C. so as to produce in the reaction zone particulate metal sulfate and gaseous boron containing material which boron material is stripped from the reaction zone along with the gaseous effluent of superheated steam and recovering the boric acid from the gaseous material.

---

Figure 1:
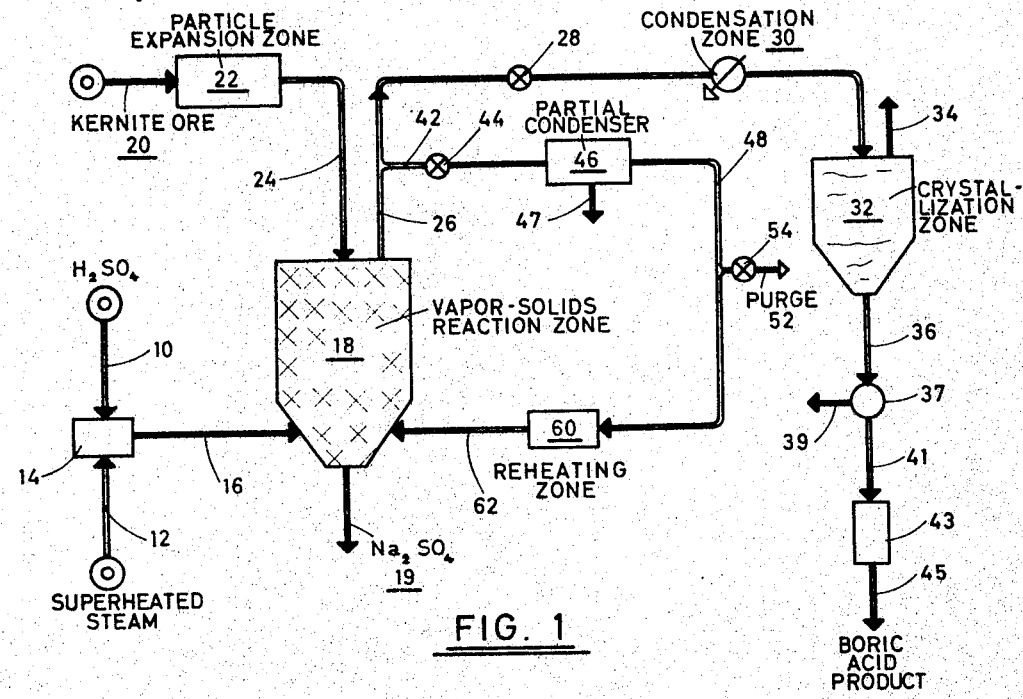

The present invention relates to the production of boric acid and its dehydration product, boric oxide, and more particularly, it relates to the production of boric acid from alkali metal borates such as the naturally occurring and abundant mineral ore, kernite.

Boric acid and derivatives thereof are consumed chiefly in the glass and ceramics industries; and, to a lesser although important extent in formulating a wide variety of products including herbicides, fertilizers, antifreezes, weed control chemicals, soaps and cleaners, drugs, cosmetics, and fire retarding agents. Additionally, boron containing fibers show high application potential for areonautical, industrial, and civilian construction materials. The preferred commercial method of preparing boric acid, at present, is by way of digestion with a mineral acid followed by partial evaporation of the resulting liquor and crystallization of boric acid, although methods are known in the art whereby boric oxide and boric acid can be recovered by pyrolysis of metal borates including colemanite and ulexite. In accordance with the pyrolysis method which is described in U.S. Patent 2,898,192, colemanite ($2CaO \cdot 3B_2O_3 \cdot 5H_2O$) is moistened with water and charged into a reaction furnace heated to an elevated temperature. Heat transferred into the moistened solid reaction mass generates saturated steam which carries boric oxide out of the furnace for condensation in a suitably cooled recovery zone. It is further disclosed that an acidic oxide, e.g., silica, enhances boric oxide removal. While it is disclosed that some boron containing material is removed at temperatures as low at 300° F., the rate of recovery is slow even at about 1000° F.; and furnace temperatures as high as 1900° F. are exemplified in the patent. In accordance with another high temperature method of recovering boric acid which is described in U.S. Patent 3,026,178, substantially anhydrous HCl either in pure form or admixed with an inert carrier gas such as, e.g., nitrogen, contacts a metal borate in a heated reaction furnace. Boron containing material is removed in the gaseous effluent and condensed to produce boric acid. The lowest reaction temperature which is disclosed for operability is about 500° C. and an upper limit of about 1400° C. is disclosed. While these and other pyrolysis methods for recovering boric acid are disclosed in the art, pyrolysis of metal borates has not been employed in commercial practice for reasons including the relatively high temperatures and protracted reaction times required to effect economical yields, problems arising from the necessity of transferring large quantities of heat from reactor walls into and through solid materials of poor heat conductivity, and the handling of gaseous material having a highly corrosive nature toward practicable materials of construction. It is, therefore, the principal object of the present invention to provide a commercially practicable and economically feasible vapor phase process for recovering boric oxide and boric acid from metal borates which overcomes and eliminates the inherent disadvantages of the prior art.

Another object is to provide a vapor phase process for recovering boric acid in which at least a substantial portion of the reaction heat is transferred into a non-corrosive gaseous material and thence to the reacting solids via contact of such solids directly with such heated gaseous material.

Another object is to provide a process for recovering boric acid which can be effected within the confines of conventional, economically practicable materials of construction.

Another and more specific object is to provide an economically feasible process for recovering boric acid from kernite.

Another and yet more specific object is to provide an economically feasible process for recovering high purity boric acid substantially free of sulfate or chloride impurities at a rapid rate employing a minimum number of solids handling steps.

Other objects and advantages inherent in the present invention will become apparent from the following description and disclosure.

The process of the present invention is predicated upon the discovery that a gaseous mixture comprising a minor percentage of sulfur trioxide and superheated steam, when brought into contact with the sodium borate mineral ore, kernite, at an elevated temperature, effects substantially complete removal of the $B_2O_3$ value from this ore at a surprisingly rapid rate. For example, it was found that about 95% of the $B_2O_3$ value in kernite ore was removed in about 1.8 hours employing a reaction temperature of only about 300° C. The entrance gas composition contained steam and about 1.7% by weight sulfuric acid.

Accordingly, the objects of the present invention are generally accomplished in the following manner. A gaseous reaction mixture is prepared by superheating steam and admixing such steam which is present in major proportion with a minor proportion of a sulfur trioxide-containing material such as, e.g., sulfuric acid, which is volatilized and decomposed to produce steam and sulfur trioxide, or with sulfur trioxide in gaseous or liquid form. Comminuted alkali metal borate is charged to a suitable gas-solids reaction zone, which includes, e.g., a fluidization reactor, a rotary kiln, or like means for achieving beneficial agitation during reaction, as well as static bed reactors such as, e.g., a shaft furnace. The gaseous mixture comprising superheated steam and sulfur trioxide, is brought into contact with the metal borate in the reaction zone which is maintained at a temperature at least above the decomposition temperature of boric acid (about 185° C.). The combined action of the above described steam-sulfur trioxide-containing mixture effects liberation of boron containing gaseous material, e.g., as boric acid, which is swept out of the reaction zone by the stripping action of the superheated steam while the alkali metal in the solid particulate ore is combined to produce an alkali metal sulfate, such as, $Na_2SO_4$ which can be withdrawn and credited as a useful byproduct of the reaction. Within the temperature range of operation employed herein, boric acid is stable in the presence of steam while in the absence of steam it forms the dehydration product thereof. The boron value present in the gaseous reaction effluent is recovered as boric acid in a highly purified condition.

The use of superheated steam in the reaction zone as distinguished from saturated steam is an essential part of the present invention necessary to accomplish the objects of the present invention.

The gaseous reaction mixture comprising superheated steam and sulfur trioxide-containing material is preferably prepared in the following manner. Gaseous material containing steam is separately superheated to an elevated temperature such that the temperature of the steam-sulfur trioxide-containing mixture obtained by introducing the sulfur trioxide-containing material into the steam is at least equal to the temperature in the reaction zone; and, most preferably, the steam is superheated to an elevated temperature such that the temperature of the gaseous mixture resulting from introduction of sulfur trioxide containing material is substantially above the temperature level at which it is desired to maintain the reaction such that at least a portion of the heat required to effect the reaction and to maintain the elevated temperature in the reaction zone is derived by transfer of heat directly to the solids from the gaseous material in the reaction zone. In order to maintain a suitable driving force for heat transfer it is desirable separately to superheat the steam to a level such that upon admixture with sulfur trioxide containing material, the resulting geaseous mixture is at a temperature of at least about 40° C. above the desired reaction temperature. In this manner the problem of solid to solid heat transfer through the reaction zone walls and through the solid material in the reaction zone is reduced and eliminated. It is apparent that by superheating the steam which comprises a major portion of the gaseous mixture introduced to the reaction zone prior to admixture thereof with the acidic component, corrosion problems are minimized.

One preferred method of generating steam for use in the process of the present invention comprises employing the substantially complete combustion of a suitable normally gaseous hydrocarbon, e.g., a $C_1$–$C_3$ hydrocarbon, e.g., such as is contained in natural gas, to obtain a mixture containing essentially carbon dioxide, nitrogen, and superheated steam at an elevated temperature up to about 3600° F. (about 1985° C.). It has been observed that the carbon dioxide present in the steam has no deleterious effect upon the removal of boron containing material from the alkali metal ore. Sulfuric acid is admixed with the gaseous mixture containing essentially superheated steam, carbon dioxide, and nitrogen and thereby vaporized and decomposed into sulfur trioxide and more steam. The above described preferred method of generating superheated steam is particularly desirable at locations where both natural gas and excess sulfuric acid or liquid sulfur trioxide are available. Where it is necessary or desirable to produce sulfur trioxide at the plant site, the following preferred method of generating the sulfur trioxide as well as superheated steam can be usefully employed. Both sulfur trioxide in dilute gaseous admixture with inert material such as nitrogen (about 5 to about 15% $SO_3$) and superheated steam at a temperature between about 400–500° C., for example, are separately generated in a conventional catalytic contact sulfuric acid plant. In conjunction with the process of the present invention, the dilute stream containing sulfur trioxide obtained from the catalytic contact converter in which $SO_2$ is converted to $SO_3$ is admixed with superheated steam produced by indirect heat exchange of steam with the effluents of either one or both the sulfur combustion zone and the catalytic conversion zone to prepare the gaseous reaction mixture for use in the gas-solids reaction zone. More specifically, sulfur or hydrogen sulfide is combusted in air or another suitable oxygen containing gas at about 1600° F., for example, to produce a gaseous mixture comprising about 9 percent sulfur dioxide. The high temperature level heat of the sulfur dioxide containing effluent is recovered by indirect heat exchange against steam which is thereby superheated. The sulfur dioxide is then converted to sulfur trioxide in a conventional multitray-catalytic conversion zone having four catalyst trays containing a conventional vanadium pantoxide oxidation catalyst. The conversion efficiency is about 98 percent, for example. The exothermic heat of conversion is recovered between catalyst stages one and two, for example, by superheating steam which is maintained in indirect heat exchange relationship with the gaseous effluent of the first reaction stage. Gaseous material containing sulfur trioxide is withdrawn at an elevated temperature from the catalytic conversion zone, admixed with superheated steam produced in the contact plant as previously described and such additional steam as may be required and passed to the gas solids reaction zone of the present invention. It is apparent that the above described preferred embodiment is a highly efficient method of generating the gaseous reaction mixture required in the process of the present invention. Moreover, such method eliminates the absorption operation conventionally performed in making contact sulfuric acid in which dilute sulfur trioxide is absorbed in highly concentrated sulfuric acid.

Preferably, the sulfur trioxide content of the gaseous reaction mixture of superheated steam and sulfur trioxide-containing material is adjusted such that the gaseous effluent withdrawn from the reaction zone remains essentially free of sulfur trioxide. Such limitation of the sulfur trioxide content of the feed is preferable because it permits the production of sulfate-free boric acid employing a minimum number of recovery steps, e.g., simply by total condensation and crystallization of the reaction effluent. Such recovery method yields a product containing boric acid present essentially as 100% ortho-boric acid. Suitable adjustment and control of the sulfur trioxide content of the gaseous reaction mixture is achieved, e.g., by periodic or continuous analysis of the gaseous reaction effluent and responsive adjustment of the ratio of steam to sulfur trioxide in the gaseous feed. As previously described, the sulfur trioxide content of the gaseous reaction mixture is generally held to a minor proportion of the over-all mixture on a weight basis.

While the above described limitation of the sulfur trioxide content of the gaseous reaction mixture is preferred from the standpoint of recovering sulfate free boric acid product, from a rate standpoint, it is preferable to admix sufficient sulfur trioxide in the superheated steam introduced into the reaction zone such that the gaseous reactor effluent contains a minor percentage of sulfur trioxide. Thus, in an alternative embodiment of the present invention the sulfur trioxide content of the gaseous feed to the reaction zone is adjusted such that excess sulfur trioxide is observed in the reactor effluent. For this purpose, the sulfur trioxide content of the gaseous feed to the reactor can be as high as about 25% by weight of the total gaseous feed to the reactor. Larger percentages of sulfur trioxide are to be avoided since excessive sulfur trioxide causes severe coating of the particulate reaction material with the alkali metal sulfate, e.g., sodium sulfate, which adversely affects reaction rate. Preferably, however, in this alternative embodiment the percentage of sulfur trioxide in the reaction effluent is limited to about 15 percent and most preferably it is less than about 1.5 percent by weight.

In conjunction with the alternative embodiment of the present invention in which a minor percentage of sulfur trioxide is maintained in the gaseous reactor effluent, the sulfur trioxide as well as superheated steam can be recovered and reutilized in the following manner. It is also understood, that steam, alone, can be recovered and recycled as follows. A gaseous reactor effluent containing superheated steam, boric acid, and sulfur trioxide is passed through a partial condensation zone which is maintained under suitably reduced temperature conditions to condense boric oxide and/or boric acid while permitting the steam and sulfur trioxide to pass therethrough as gaseous material. The boron value recovered in this manner is present as a mixture of ortho- and meta-boric acids. The partial condensation zone is preferably maintained between about 200° C. and about 300° C. for these purposes. Steam and sulfur trioxide passed through the partial condensation zone is preferably reheated, e.g., by direct addition of superheated steam or by indirect heat exchange, at least up to reaction temperature and, most preferably higher than reaction temperature, and recycled to the reaction zone.

While the gaseous mixture comprising steam and sulfur trioxide is effective in removing boron values from the metal borate at a temperature which is at least about 185° C., it is preferred to maintain a reaction temperature between about 275° C. and about 500° C. Within the preferred temperature range of operation, the $B_2O_3$ values contained in the metal borate ore can be substantially completely removed at a rapid reaction rate in a commercially attractive manner, taking into consideration the cost of providing the requisite thermal energy for the reaction. Where it is desirable to employ the above described recycle of sulfur trioxide and steam to the reaction zone, it is preferred to employ a reaction temperature between about 400° C. and about 550° C.

The method of the present invention finds particular applicability in the recovery of boron values from the naturally occurring and abundant mineral kernite ($Na_2B_4O_7 \cdot 4H_2O$). Kernite particles are obtained from the mine as essentially spherical particles with a size range from about +4 to 150 mesh screen size (about 85% of the ore being between about 100 and about 120 mesh size) and having a bulk density of from 50–60 lbs. per cubic foot, undergo a readily observable expansion upon heating. Friable hollow spheres are formed which shatter to produce a large percentage of hollow shelled, partially spherical particles. During the heating process the bulk density of the particles changes from an initial bulk density from 50–60 lbs. per cubic foot to about 10 to 12 lbs. per cubic foot. By reason of the noticeable change in bulk density of the particles upon heating thereof, it is preferable to heat the kernite ore to at least the temperature at which expansion occurs (about 70° C.) prior to introduction of such ore into the reaction zone. The expanded and shattered kernite can be maintained as a turbulent, dense phase bed in a reaction zone by flowing the gaseous reaction mixture upwardly therethrough at a suitable superficial velocity.

Referring now to the drawings, FIGURE 1 illustrates, diagrammatically, a process flow plan for carrying out the process of the present invention, including two alternative methods for recovering boric acid from the gaseous effluent of reaction zone 18.

Figure 2:
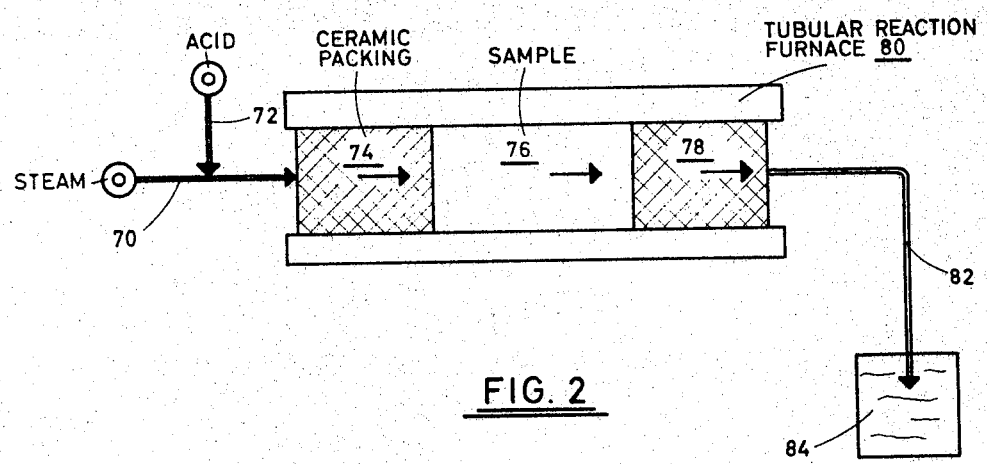

FIGURE 2 illustrates diagrammatically in elevation, laboratory apparatus employed in the treatment of kernite with steam-sulfur trioxide gaseous mixtures.

Figure 3:
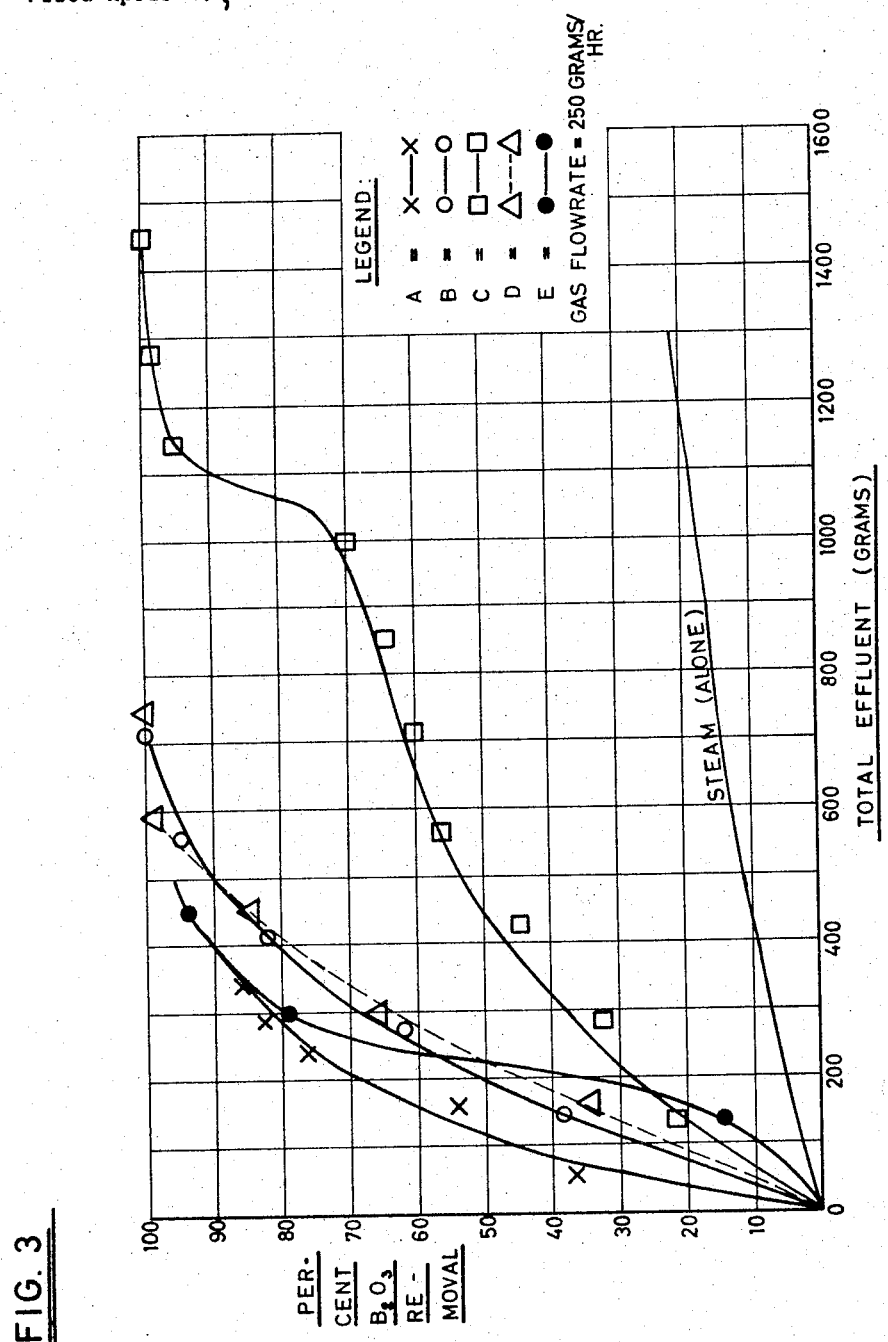

FIGURE 3 graphically presents several examples of operation of the present invention.

Referring to FIGURE 1, particulate kernite ore is introduced in line 20 to particle expansion zone 22, in which the kernite is expanded, as previously hereinbefore described, by heating to a temperature above about 70° C. The expanded particulate material is passed via conduit 24 into vapor solids reaction zone 18 for reaction with a gaseous reaction mixture comprising superheated steam and sulfur trioxide introduced via 18. The gaseous mixture in 18 is prepared by admixing superheated steam in line 12 and liquid sulfuric acid in line 10 in mixing zone 14 under conditions to vaporize and decompose the sulfuric acid in the superheated steam.

In vapor solids reaction zone 18, the gaseous mixture introduced in line 16 contacts the expanded kernite at an elevated temperature to liberate $B_2O_3$ values which are stripped into the gaseous effluent in overhead line 26. When the expanded kernite particles are contacted with the steam-sulfur trioxide mixture to liberate $B_2O_3$ values, relatively high grade sodium sulfate is produced as the solid reactor product in zone 18. The sodium sulfate is withdrawn from zone 18 via conduit 19. When the boric oxide containing gaseous effluent in line 26 is substantially free of sulfur trioxide, it is preferable to recover boric acid by total condensation and crystallization. In such an alternative embodiment of the process of the present invention, the effluent in line 26 is passed through open valve 28 into total condensation zone 30, valve 44 in line 42 being maintained in a closed position. The condensation zone is preferably maintained under conditions such that the steam and $B_2O_3$ values are totally condensed therein. The resulting liquor comprising boric acid present as essentially 100% ortho-boric acid dissolved in water is passed to crystallization zone 32 in which boric acid crystals separate from the liquor and are withdrawn in line 36. Inert gaseous material is purged from the crystallization zone by means of vent 34. Boric acid crystals are separated from residual liquor by means of suitable separation apparatus such as a centrifuge 37. The separated liquor is withdrawn to waste in line 39 or recycled if desired. The boric acid crystals are passed by means of line 41 to dryer 43 and crystalline boric acid product is withdrawn in line 45.

When excess sulfur trioxide gas is present in effluent 26 of zone 18, such sulfur trioxide as well as the steam gas can be recovered for recycle in accordance with the alternative embodiment hereinafter described. Valve 28 is closed while valve 44 in line 42 is opened to permit the vaporous effluent in line 26 to flow through line 42 into partial condenser 46. Boric oxide is condensed on relatively cold surfaces in 46 and is thereafter withdrawn by scraping or washing in line 47. Steam and sulfur trioxide which passes through condenser 46 flows in line 48 to reheating zone 60. A portion of the vaporous mixture is purged by opening valve 54 in line 52 to prevent the buildup of inerts. The vaporous mixture in line 48 is heated to at least about the temperature maintained in zone 18 in reheating zone 60; and, reintroduced via conduit 62 to reaction zone 18. Sodium sulfate, in particulate form is withdrawn from the reactor on line 19 as a by-product of the process.

Examples are presented in Table 1, below, in order to further illustrate the operation of the embodiments of the invention described above with reference to FIGURE 1 of the drawings. Example 1 illustrates removal of $B_2O_3$ values in accordance with the present invention in reaction zone 18 in conjunction with recovery of boric acid product by total condensation and crystallization. Example 2 illustrates the recovery of boric acid by partial condensation of $B_2O_3$ values from steam in the reaction effluent.

Table 1

EXAMPLE 1

| Reference No. Fig. 1 | Material description | Flow rate, lbs./hr. | Temp. (° C.) | Pres. (p.s.i.g.) | Product quality, percent |
|---|---|---|---|---|---|
| 10 | $H_2SO_4$ | 100 | 340 | | |
| 12 | Steam | 143,500 | 340 | 7 | |
| 16 | Steam $SO_3$ | 143,500 | 340 | 7 | |
| 22 | Kernite | 224 | 30 | | |
| 18 | Rx zone | | 300 | 7 | |
| 19 | $Na_2SO_4$ | 135 | 300 | | 98 |
| 26 | $B_2O_3$ | 134 | | | |
| | Steam | 143,518 | 280 | | |
| 45 | Crystals $H_3BO_3$ | 238 | | | |

EXAMPLE 2

| Reference No. Fig. 1 | Material description | Flow rate, lbs./hr. | Temp. (° C.) | Pres. (p.s.i.g.) |
|---|---|---|---|---|
| 10 | $H_2SO_4$ | 100 | 510 | |
| 12 | Steam | 100,000 | 510 | 7 |
| 16 | Steam $SO_3$ | 100,100 | 510 | 7 |
| 22 | Kernite | 224 | 30 | |
| 18 | Rx zone | | 500 | 7 |
| 26 | $B_2O_3$ | 134 | | |
|  | $SO_3$ | | | |
|  | $H_2O$ | 100,000 | 480 | 5 |
| 46 | Partial cond | | 185–200 | |
| 47 | $B_2O_3$ | 134 | | |
| 60 | Reheat zone | | 550 | |

FIGURE 2 illustrates, diagrammatically, in elevation, laboratory apparatus in which Examples 3 thru 7, which are graphically represented in FIGURE 3, were carried out. Steam introduced in line 70 picks up sulfuric acid mist introduced in line 72; and the resulting vaporous mixture is passed through heated ceramic packing 74 in which sulfuric acid is thermally decomposed to form sulfur trioxide gas and additional steam. The ceramic packing 74 and 78 as well as the charge 76, are maintained at a suitably elevated reaction temperature by means of the tubular reaction furnace 80. Reaction takes place in sample 76 to produce sodium sulfate and boric acid. The boric acid is thus stripped from the sample and the resulting effluent is passed through ceramic packing 78 into conduit 82 for discharge into condenser vessel 84.

EXAMPLES 3, 4, 5, 6, 7

Five, 2-gram samples of kernite ore, A, B, C, D and E designated in the legend of FIGURE 3, were separately charged to reaction furnace 80 of FIGURE 2 following calcination at 400° C. and treated with a steam-acid gas mixture in accordance with the procedure hereinbefore described with reference to FIGURE 2 under conditions set forth in Table 2, below.

Table 2

| Sample | Temp. (° C.) | Percent $H_2SO_4$ in exit gas | Total gas flow rate (grams/hour) |
|---|---|---|---|
| A | 500 | 25 | 250 |
| B | 500 | 1.5 | 250 |
| C | 500 | 0.15 | 250 |
| D | 400 | 1.04 | 250 |
| E | 300 | 0.75 | 250 |
| Steam (alone) | 500 | | 250 |

In FIGURE 3, the total effluent in grams is plotted versus percent $B_2O_3$ removal from the kernite ore. Since the proportion of steam to sulfuric acid in the feed gas was large the weight rate of flow of the effluent gas as compared with the feed gas was not appreciably changed due to the exchange of sulfate in the feed for boron oxide in the effluent. Thus, the total grams of effluent when divided by the gas flow rate yields an approximate value for reaction time. Accordingly, it is observed that samples B and D were substantially completely reacted within about 3 hours. It is likewise observed that when steam alone is employed within this temperature range a very low yield and slow rate is observed. A further observation was made in regard to sample C. After about 1000 grams of total effluent were collected, the sample was removed from the furnace thereby providing sufficient agitation to remove sodium sulfate. When the sample was recharged to the furnace and heated with additional gaseous reaction mixture, the rapid increase in rate illustrated in FIGURE 3 was noticed. This indicates that agitation sufficient to remove sodium sulfate during the reaction is beneficial and substantially enhances the reaction rate.

Having thus described the invention in specific terms with reference to examples thereof, many modifications and alterations thereof will become apparent to those skilled in the art without departing from the spirit and scope thereof which is intended to be limited only by the claims.

What is claimed is:

1. A process for producing boric acid from an alkali metal borate which comprises: Preparing a gaseous reaction mixture comprising a major proportion of superheated steam and a minor reactive proportion of sulfur trioxide-containing material, providing alkali metal borate particles in a suitable reaction zone maintained at a reaction temperature at least above about 185° C., contacting said gaseous reaction mixture and said alkali metal borate particles in said reaction zone thereby producing a particulate alkali metal sulfate and gaseous boron containing material, stripping said gaseous boron containing material from said reaction zone in the gaseous effluent containing superheated steam and recovering boric acid from said gaseous material.

2. The process of claim 1 in which the proportion of sulfur trioxide-containing material in the gaseous reaction mixture is adjusted such that the said gaseous effluent containing superheated steam and gaseous boron containing material is substantially free of sulfur trioxide containing material.

3. The process of claim 1 in which said boron containing gaseous material contained in the effluent of said reaction zone is recovered by total condensation of said reaction effluent followed by crystallization of boric acid from the resulting liquor.

4. The process of claim 3 in which said reaction temperature is maintained between about 275° C. and about 500° C.

5. The process of claim 1 in which said boron containing gaseous material contained in the effluent of said reaction zone is recovered by reducing the temperature of said gaseous effluent to a level sufficient to condense therefrom the boron containing material while permitting said steam to remain as gaseous material.

6. The process of claim 5 in which said reaction temperature is maintained between about 400° C. and about 550° C.

7. The process of claim 1 in which said alkali metal borate comprises particulate kernite mineral ore.

8. The process of claim 7 in which said kernite mineral ore is heated to a temperature in excess of about 70° C. thereby causing expansion of said particulate ore and substantial reduction in bulk density, and introducing such material of reduced bulk density into said reaction zone.

9. The process of claim 8 in which said expanded kernite containing material is maintained in a turbulent fluidized condition in said reaction zone.

10. The process of claim 1 in which said gaseous reaction mixture is prepared by separately superheating gaseous material containing steam to an elevated temperature and admixing therewith sulfur trioxide-containing material such that the temperature of the resulting gaseous mixture is at least equal to the temperature maintained in the reaction zone.

11. The process of claim 10 in which the temperature of the resulting gaseous mixture is substantially above the temperature maintained in the reaction zone such that heat is transferred thereto from said gaseous mixture.

12. The process of claim 1 in which said gaseous reaction mixture is prepared by substantially completely combusting a normally gaseous hydrocarbonaceous feed material to produce a mixture comprising superheated steam, carbon dioxide, and nitrogen at an elevated temperature, admixing such mixture and sulfuric acid to produce a mixture comprising sulfur trioxide, superheated steam, carbon dioxide, and nitrogen at a temperature above said reaction temperature, and passing the resulting gaseous mixture into said reaction zone.

13. The process of claim 1 in which said gaseous reaction mixture is prepared by providing superheated steam, admixing therewith sulfur trioxide, and passing the resulting gaseous mixture into said reaction zone.

14. The process of claim 13 in which said gaseous reaction mixture is prepared by converting sulfur dioxide to sulfur trioxide in a multistage-catalytic conversion zone, passing steam in indirect heat exchange relationship with the sulfur containing gaseous material in said conversion zone to recover the exothermic heat of the conversion to superheat said steam, withdrawing a dilute gaseous stream containing sulfur trioxide from said conversion zone, admixing therewith the thus superheated steam, and passing the resulting gaseous mixture into said reaction zone.

15. A process for producing boric acid which comprises: providing a gaseous reaction mixture containing a major proportion of superheated steam and a minor reactive proportion of sulfur trioxide-containing material at an elevated temperature, contacting said gaseous reaction mixture and particulate kernite ore in a reaction zone maintained at a temperature below the temperature of said gaseous reaction mixture and between about 400° C. and about 550° C. to produce sodium sulfate containing particulate material and a gaseous boron containing material, removing said gaseous boron containing material in a gaseous effluent comprising superheated steam and a reduced proportion of sulfur trioxide containing material, reducing the temperature of said gaseous effluent to a level sufficient to condense therefrom the boron containing material while permitting said steam and sulfur trioxide containing material to remain as gaseous material, reheating the remaining gaseous material to a temperature of at least about the temperature of said reaction zone, and reintroducing such material into said reaction zone.

16. A method of producing boric acid from kernite containing ore which comprises: treating kernite containing mineral ore particles having a relatively high bulk density at a temperature in excess of about 70° C. to expand such particulate material thereby producing kernite of substantially reduced bulk density, introducing such kernite of reduced bulk density into a reaction zone maintained at a temperature between about 275° C. and about 500° C., contacting such kernite in said reaction zone with a gaseous reaction mixture comprising a major proportion of superheated steam and a minor reactive proportion of sulfur trioxide, said gaseous reaction mixture being introduced at a temperature substantially in excess of said reaction zone temperature, thereby producing particulate material comprising sodium sulfate and gaseous boric oxide, stripping said gaseous boric oxide from said particulate material in superheated steam, and recovering said boric oxide from said steam as boric acid.

References Cited

UNITED STATES PATENTS

| 137,072 | 3/1873 | Gutzkow | 23—149 |
| 1,259,717 | 3/1918 | Blumenberg | 23—149 X |

FOREIGN PATENTS

| 238,428 | 8/1925 | Great Britain. |
| 1,007,873 | 10/1965 | Great Britain. |
| 572,804 | 2/1958 | Italy. |
| 117,372 | 1959 | U.S.S.R. |

HERBERT T. CARTER, *Primary Examiner.*

U.S. Cl. X.R.

23—121